Nov. 27, 1951            R. A. BECKWITH            2,576,478

HEAVY DUTY TRANSMISSION

Filed Dec. 3, 1946            4 Sheets-Sheet 3

INVENTOR
R. A. Beckwith
BY
Pott & Pott
ATTORNEYS

Nov. 27, 1951 R. A. BECKWITH 2,576,478
HEAVY DUTY TRANSMISSION
Filed Dec. 3, 1946 4 Sheets-Sheet 4

INVENTOR
R. A. Beckwith
BY Robbs Robb
ATTORNEYS

Patented Nov. 27, 1951

2,576,478

UNITED STATES PATENT OFFICE 2,576,478

HEAVY-DUTY TRANSMISSION

Raymond A. Beckwith, Milwaukee, Wis., assignor to Koehring Company, Milwaukee, Wis., a corporation Application December 3, 1946, Serial No. 713,722

8 Claims. (Cl. 74—740)

This invention relates to power transmissions, and more especially to improvements in constant power flow transmissions for heavy duty service, such as for trucks, buses, and other heavy vehicles, industrial machinery, and the like.

In most of the prior power transmissions employed for transmitting power at variable speed from a rotary driving member or motor to a rotary driven member, such as the propeller shaft of a vehicle, it is necessary to interrupt the drive during the periods of changing speeds as commonly performed by shifting gears. Such interruption of the drive is particularly objectionable under conditions of slow speed drives, and in the case of heavy vehicles or heavy loads where the momentum or inertia of the driven member or the slowly moving vehicle is relatively low, which causes the driven member or vehicle to quickly lose speed when the power is interrupted. In the case of vehicles equipped with change speed gear transmissions of the conventional type, the road speed of the vehicle is usually slower immediately after each gear shift than the road speed already acquired before the gear shift. This consequently causes an appreciable loss of fuel economy and operating time. In many cases, the vehicle engine cannot maintain its operating speed after the gear shift has been performed, and when this happens, especially in heavy vehicles or vehicles handling heavy loads such as are encountered in hauling equipment, the vehicle must be stopped and then restarted in low gear, followed by further progressive changes in gear ratio, with intermittent interruption of power for each change until the highest speed that can be maintained by the engine is attained.

The present invention has for its primary object the selective attainment of speed changes without any interruption of power transmission or change of the engine throttle control and its output torque, thereby causing a proportionately large and constant torque to pass through the transmission while the speed change is being made.

A further object of the invention is to provide an auxiliary power flow, preferably at a reduced ratio of speed below that of the driven member, through a selective speed change gear mechanism during the period of changing gears, which auxiliary power flow is automatic and is synchronized with the gear changing cycle, without any conscious effort on the part of the operator, and without any change in throttle control or loss of engine speed.

Another object of the invention is to provide an improved variable speed power transmission which is simple and compact in construction, flexible in its adaptations, and efficient in operation.

A still further object of the invention is to provide a constant power flow transmission embodying a standard or other suitable selective speed change gear unit which is adapted to be connected at its input end, through an intermediate friction clutch of conventional or other suitable type, to a rotatable driving member such as a gasoline or diesel engine or other prime mover, said gear unit also being associated with an electromagnetic power transmission unit including an eddy current device, which is adapted to be energized during the periods of changing gears of the gear unit, so as to produce an auxiliary source of power which is transmitted to a driven member by the said power transmission unit including the eddy current device, preferably at a suitable reduced gear ratio attained by a planetary gear mechanism disposed between and operatively connected with the eddy current device and the driven member at the output end of the gear unit.

Yet another object of the invention is to provide a constant power flow variable speed transmission embodying, in combination, a selective speed change gear unit adapted to be connected and disconnected from a driving member at will, for transmitting power at variable speeds to a driven member, and an electro-magnetic power transmission unit which serves to transmit power to the driven member independently of the speed change gear unit, when the latter is disconnected from the driving member during periods of changing gears, said electro-magnetic unit being also adapted to serve as a brake for the driven member during transmission of power directly from the speed change gear unit to the driven member.

Other and further objects and advantages of the invention will be hereinafter described, and the novel features thereof defined by the appended claims.

Like reference characters designate corresponding parts in the several figures of the drawings, wherein 1 denotes a rotatable driving member such as the crank shaft extension of a gasoline or diesel engine or other prime mover. Attached to the driving member 1, in any suitable manner, as by means of bolts 2, is a flywheel 3 which may have any suitable form, and which coacts with a clutch of suitable type, such as a friction disc clutch generally designated 4. The details of the friction clutch 4 are immaterial to the present invention, it being sufficient to say that the friction clutch includes an axially shiftable disc 5 which may be shifted into engagement with the flywheel 3, and disengaged therefrom, at will, by any suitable instrumentalities such as the clutch actuating means generally indicated at 6, the latter being operated in any suitable manner as by means of a conventional food pedal (not shown).

The clutch disc 5 is slidably mounted on and splined to a sleeve 7 which is preferably an integral part of transmission gear pinion 8 which is the first gear in a gear drive of a standard heavy duty speed change gear unit generally designated 9. While the change speed gear unit illustrated in the drawings corresponds to a known type of transmission, it is to be understood that the invention is not limited to change speed gear units of the precise construction. In the construction as illustrated, the pinion 8 meshes with a gear 10 which is keyed or otherwise fixed to a cluster gear shaft 11 upon which also are mounted a plurality of additional gears respectively designated 12, 13, 14, and 15. These gears mesh with speed change gears 12', 13', 14', and 15', the latter group of gears being mounted on the main transmission shaft 16 which extends longitudinally through the change speed gear unit 9, and is located above and parallel to the cluster gear shaft 11.

The arrangement of the gears as just described corresponds to that of a regular five-speed transmission, by means of which changes in speed or gear ratios are attained by shifting the gears in the conventional and well known manner, said speed changes or gear shifting being performed by means of a gear shift lever generally designated 17. Preferably included as a part of the change speed gear mechanism are synchro-mesh units 18 and 19 which serve to bring the rotation of the gears associated therewith, that are to be engaged to a sliding spline unit on the transmission shaft 16, down to relative speeds before engagement of the jaws 20 is attempted. These synchro-mesh units are well known in their construction and operation, and hence need not be described in further detail.

In the ordinary power transmission system embodying a change speed gear unit corresponding to the gear unit 9 described above, the transmission shaft 16 would normally be connected to a driven member such as the propeller shaft of a vehicle, and whenever a change in speed or gear ratio is required, it is first necessary to interrupt the drive or power flow between the driving member and the driven member, as by disengaging the friction clutch 4. At the same time that the drive or power flow is interrupted, a change in the throttle control of the engine is also necessitated in order to prevent the engine from racing and to permit the friction clutch to be reengaged smoothly and without undue slippage thereof or strain. Such interruption of the drive or power flow, accompanied by a change in the setting of the throttle normally occurs preliminary to each gear shift in the ordinary transmission system, thereby resulting in substantial losses of fuel economy and operating time, as well as giving rise to other difficulties and objections in operation, particularly in the case of applications of the transmission system to heavy duty vehicles or equipment.

In order to avoid the aforementioned difficulties, and to produce a constant power flow through the transmission during periods of changing speed or gear shifting, the transmission shaft 16 of the present transmission is not directly connected to the driven member at the output end of the transmission. Instead, I provide an auxiliary or secondary transmission shaft 21 which is extended through the transmission shaft 16, the latter shaft being hollow and rotatably receiving the shaft 21 therein in coaxial relation thereto. The shaft 21 is extended forwardly beyond the input end of the change speed gear unit 9, so that the sleeve 7 which forms a part of the first gear 8 of the change speed transmission unit is rotatably supported on the forward end of the shaft 21, the friction disc 5 of the clutch 4 being in turn slidable on and splined to the sleeve 7. At the extreme forward end of the shaft 21, the shaft 21 is splined to a hub 22 which is suitably secured to the flywheel 3 and the driving member 1, as by means of the bolts 2 which connect the flywheel to the driving member.

At the output end of the transmission, the shaft 21 is extended for a substantial distance beyond the speed change gear unit 9, and carries at its extreme rear end a pinion 23 which is keyed or otherwise rigidly secured thereto for rotation therewith. Pinion 23 is a part of a planetary gear train which will now be described.

The transmission shaft 16 is splined or otherwise coupled at its output end to a coupling sleeve 24, which in turn is splined or otherwise coupled to a hub or sleeve 25 which is rotatably mounted on the auxiliary transmission shaft 21 at the rear end of the latter. The hub or sleeve 25 is provided at its rear end with a radially extended flange or disc 26 which carries certain gears of the planetary gear train mentioned above. The flange or disc 26 is interposed between and secured in any suitable manner, as by means of bolts 27, to the complementary sections 28, 28', of a spider or housing for the planetary gear train. Thus, the spider or housing is rigidly connected to the disc or flange 26 and is rotatable therewith incident to rotation of the hub or sleeve 25. The section 28 of the spider is recessed at 29 so as to provide a pilot bearing for the extreme rear end of the auxiliary transmission shaft 21, and this same spider section is in turn rotatably supported by a bearing 30 arranged in the rear end of a housing 31 which is attached by bolts 32 to an adapter plate 33, the latter being secured by bolts 34 to the rear end of the housing 35 of the change speed gear unit 9. The spider section 28 is also integrally extended through the housing 31 and terminates in a splined driven member 36 which is adapted to be connected in any suitable manner to a rotatable part to be driven, such as the propeller shaft of a vehicle.

Continuing the description of the planetary gear train, the pinion 23 meshes with a gear 37 which is rotatably mounted between the flange or disc 26 and the spider section 28, said gear 37 in turn meshing with a gear 38 which is rotatably supported between the two spider sections 28 and 28'. The gear 38 preferably is an integral part of a double gear unit, the second gear of which is designated 39 which is located on the opposite side of the flange or disc 26 from the gear 38. The two gears 38 and 39 are connected together by an intermediate shaft portion 40 which loosely extends through an opening 41 in the flange or disc 26.

Gear 39 in turn meshes with a gear 42 formed on one end of an axially extended sleeve 43 which is rotatably mounted on the hub or sleeve 25. The sleeve 43 is suitably connected or keyed to the armature 44 of an eddy current device generally designated 45, which will now be more specifically described.

The eddy current device 45 is an adaptation of a well known magnetic slip unit and is used by me to obtain a braking action, as will later be seen. Essentially, the device comprises a rotatable armature 44, previously referred to, and a stationary field 46. The field 46 is supported upon a stationary drum 47 within which are arranged a series of radially extended fins 48 which are disposed in angularly spaced relation to each other for the purpose of allowing air to circulate through the fins, the fins being tapered so as to clear the hub 49 of the armature 44, and also the sleeve 43, with the fins all connected at one end to a plate 50 which is attached to the adapter plate 33 by the bolts 34 previously referred to. Extending radially outwardly from the drum 47 is a plurality of field poles 51, said field poles terminating in pole pieces 52 which are arranged in circumferential rows about the drum 47, the pole pieces of the respective rows being preferably staggered with relation to the pole pieces of the adjacent rows. Extending circumferentially around the drum 47, and arranged between the respective rows of poles 51 are annular grooves in which are seated field coils 53 which are wound peripherally about the drum 47. The field coils 53 are preferably connected in series with each other, as indicated by the connections 54.

The armature 44 is provided around its periphery with a plurality of transversely extended, circumferentially spaced fins or vanes 55 which are attached at their inner edges to an armature drum 56 extending about the pole pieces 52 of the field poles, in closely spaced relation thereto, leaving only a small air gap 57 therebetween.

Current is supplied to the field coils or windings 53 by any suitable source of electrical energy, such as a storage battery 58, with which most vehicles are equipped, the storage battery in turn being preferably connected with the usual generator 59 to maintain the storage battery in charged condition. When current is supplied to the field windings 53, exciting the windings, a strong magnetic field is established. The flux of this magnetic field bridges the air gap 57 between the ends of the pole pieces 52 and the armature drum 56, thereby creating strong eddy currents in the armature drum. According to well known principles, these eddy currents are of such course and direction as to react against movement of the localized flux zones in the armature drum, and as a result, when the armature is rotating, the eddy currents act to impart a braking action to the armature drum which eventually brings the armature drum to a stationary position. This braking action is a function of the intensity of the flux and the rate of slip between the field and the armature drum. The reaction of the eddy currents causes a generation of heat in the magnetic unit which is readily dissipated by the air circulation through the fins or vanes of the field and armature respectively, said air circulation assisting in the dissipation of the heat conducted through the fins and radiated therefrom.

Whenever the eddy current device is energized or excited, causing the armature 44 to come to a stop, or stall, the sleeve 43 which is keyed to the armature, together with the gear 42, is held stationary, and the power transmitted from the driving member 1 through the shaft 21 to the pinion 23 then passes through the planetary gear train 37, 38, 39, the gear 39 meshing with the stalled gear 42 and causing a rotation of the spider 28, 28' by the reaction of the gear 39 to the gear 42, thereby producing an increased torque or ratio between the driving member 1 and the driven member 36. This transmission of power from the driving member to the driven member is wholly independent of the change speed gears of the change speed gear unit 9.

Figure 1:
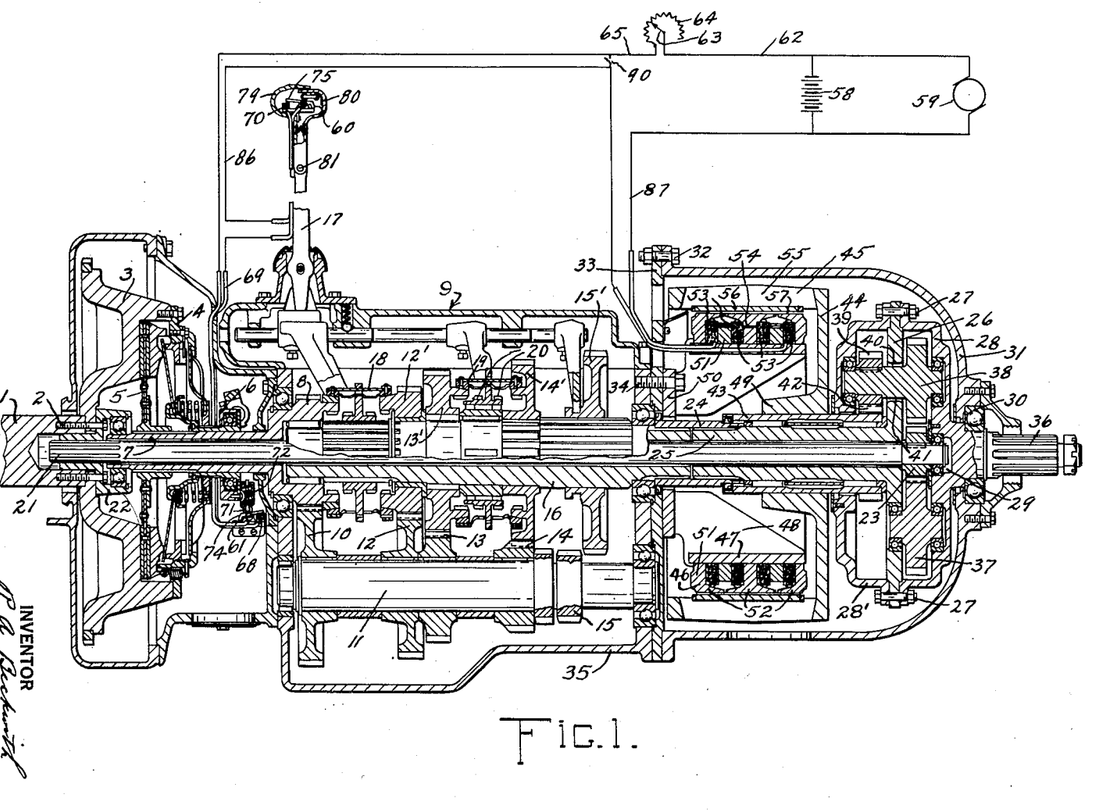
Figure 1 is a longitudinal sectional view through a transmission constructed in accordance with the present invention, and showing the cooperative relationship of the friction clutch, the speed change gear unit, and the electro-magnetic unit, together with the circuits for the latter.
Figure 2:
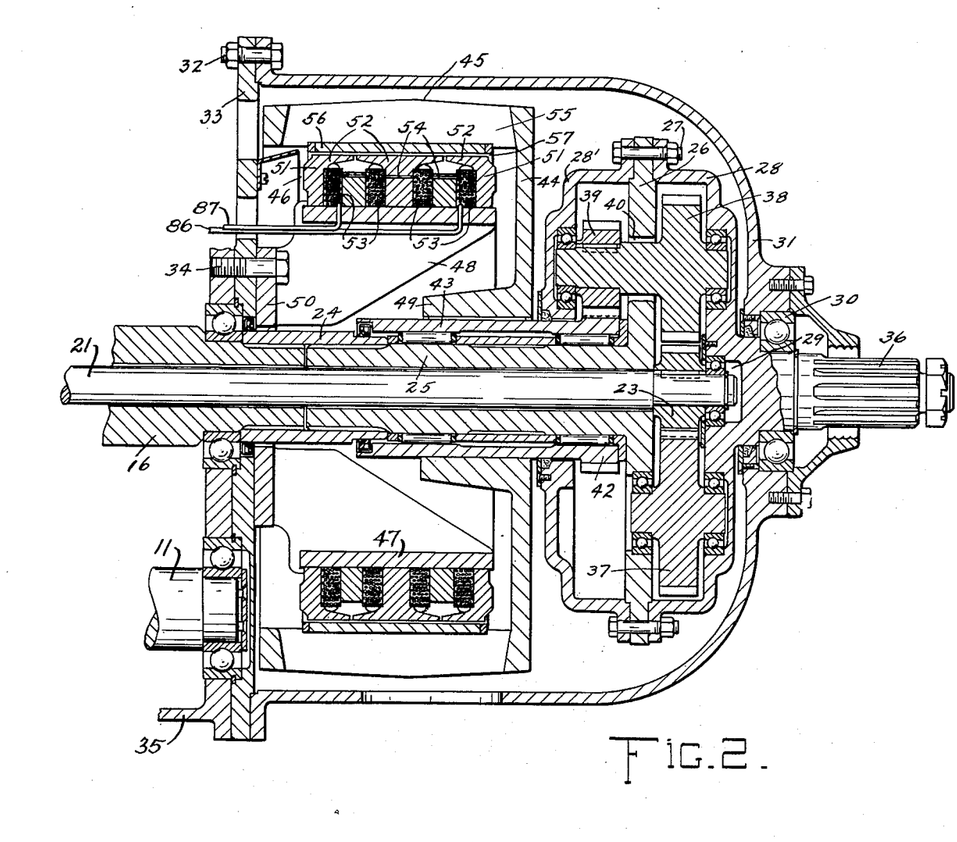
Figure 2 is a fragmentary longitudinal sectional view through the electro-magnetic unit end of the transmission assembly, illustrated on an enlarged scale.
Figure 3:
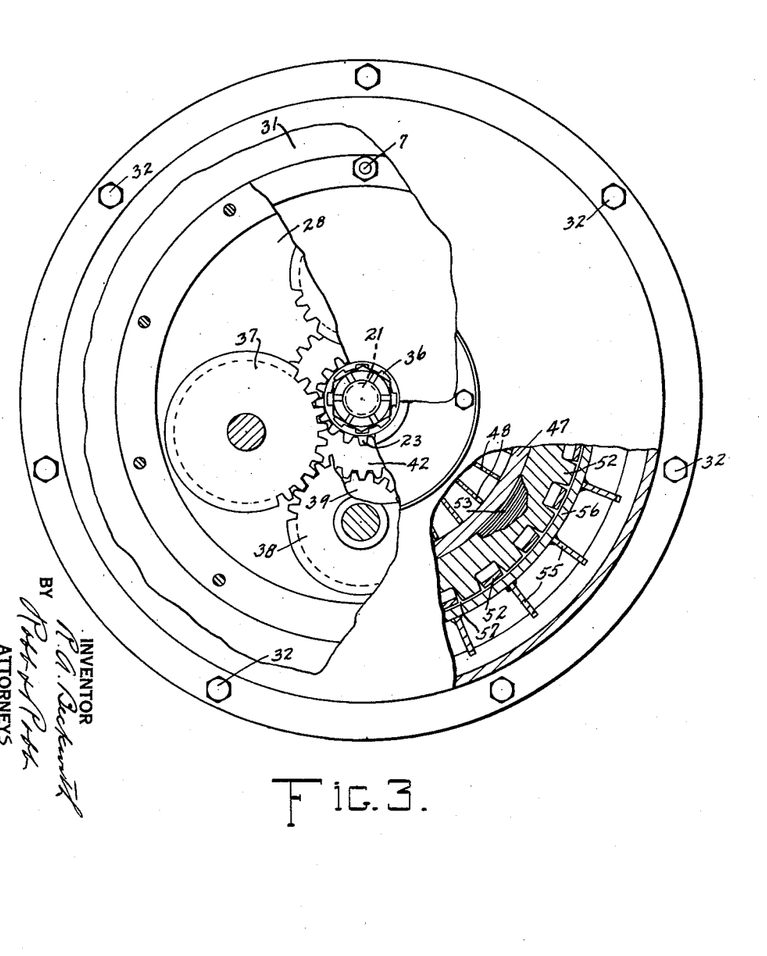
Figure 3 is a view in end elevation of the electro-magnetic unit end of the transmission assembly, with portions of the housing and other parts broken away to more clearly show the details of the planetary gear mechanism and the eddy current device.
Figure 4:
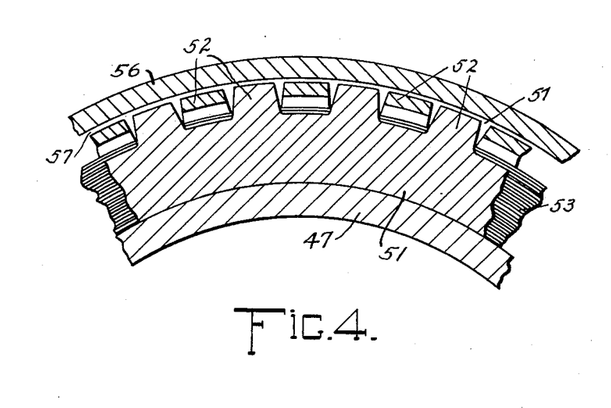
Figure 4 is a fragmentary transverse sectional view through the eddy current device, shown on an enlarged scale.
Figure 5:
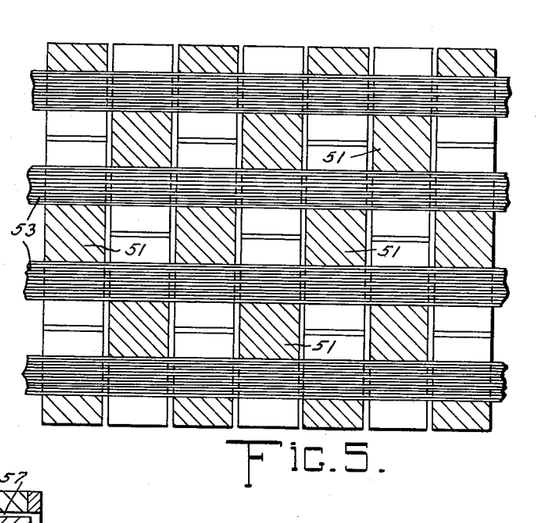
Figure 5 is a fragmentary view in developed plan showing the stationary field poles and windings of the eddy current device.
Figure 6:
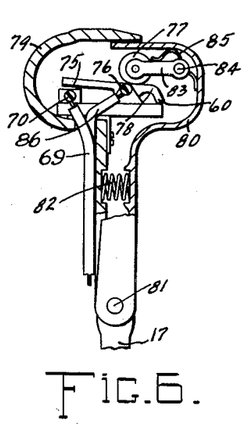
Figure 6 is an enlarged fragmentary detail view of the gear shift lever switch and its operating instrumentalities.
Figure 7:
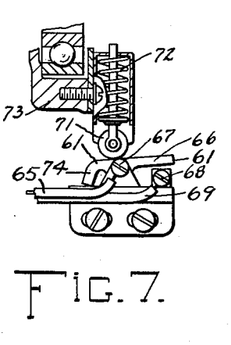
Figure 7 is an enlarged fragmentary detail view of the friction clutch actuated switch and its operating instrumentalities.
Figure 8:
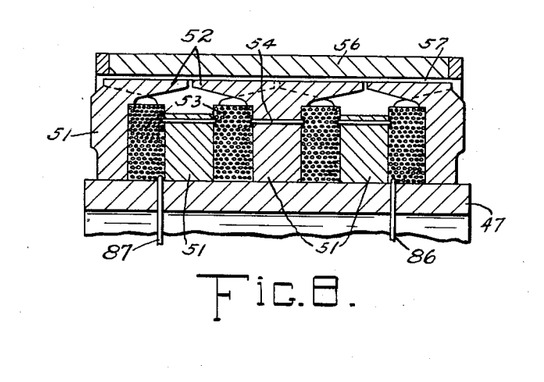
Figure 8 is an enlarged fragmentary sectional view of certain parts less clearly shown in Figures 1 and 2, including the pole pieces and field winding connection and mountings.

In carrying out the primary objective of the present invention, which is to eliminate the necessity of interrupting the power flow from the driving member to the driven member during periods of changing speeds, the unit eddy current device is so designed and controlled as to cause the field windings 53 to be energized or excited by the storage battery 58 just preceding and during the periods of changing or shifting gears of the change speed gear unit 9. To this end, suitable control instrumentalities are connected in circuit with the storage battery 58 and with the field windings 53, which control instrumentalities are operable in synchronized relation to the gear shifting or gear changes. These control instrumentalities preferably include a special switch, generally indicated at 60, which is mounted in the gear shift lever 17 so as to be operable responsive to grasping the gear shift lever by the operator's hand preparatory to shifting gears. A second switch, generally designated 61, similar to the switch instrumentalities 60, is also provided, said second switch 61 being operable responsive to actuation of the friction clutch control 6 which serves to engage and disengage the friction clutch 4. These two switches are connected in the control circuit as diagrammatically illustrated in Figure 1 of the drawings, with the switches so related to each other that both switches must be closed at the same time in order to energize or excite the field windings 53 of the eddy current device. The control circuit, as illustrated in Figure 1, includes a conductor 62 leading from one side or pole of the storage battery 58 to the adjustable arm 63 of a variable resistance 64, which has for its purpose to permit variation of the excitation of the field windings of the eddy current device. From the variable resistance 64, the circuit continues through a conductor 65 which is connected to a rockably or pivotally mounted contact member 66, pivoted to a suitable support at 67. The pivotal contact member 66 is movable towards and away from a stationary contact 68 which in turn is connected by a conductor 69 to a corresponding stationary contact 70 of the switch 60 on the gear shift lever 17. Opening and closing movements of the pivotal contact 66 of switch 61 is accomplished in any suitable manner, as by means of a roller 71 which rides upon the upper side of the contact member 66, said roller being normally urged against the contact member 66 by means of a spring 72. The spring-pressed roller 71 is fixed to and carried by an axially movable collar 73 which is slidably mounted on the sleeve 7 of gear 3, the collar 73 being shiftable axially in one direction by manipulation of the friction clutch control 6 to disengage the friction clutch 4, and in the opposite direction by manipulation of the control 6 to reengage the friction clutch. As the collar 73 is shifted axially in one direction, the spring-pressed roller 71 moves along the upper side of the contact member 66 until it passes beyond the pivot 67, at which time the pressure of the spring upon the roller serves to open or close the switch contact 66. Opening of this contact 66 occurs when the roller 71 moves to the left of the pivot 67, as shown in the drawings, the opening movement of the contact member being limited by a downwardly bent projection 74 extending from the lefthand end of the contact member, and serving as an abutment. When the roller 71 passes to the righthand side of the pivot 67, the contact member 66 will be pressed into engagement with the fixed contact member 68, thereby closing the switch.

The gear shift lever switch 60 also includes a rockable or pivotal contact member 75, pivoted at 76 to a suitable support, which contact member 75 is movable towards and away from the fixed contact member 70 by the pressure of a roller 77 which rides upon the upper side of the contact member 75. The contact 75 also includes a downwardly extended abutment 78 which limits the opening movement of this contact member. Both ocntact members 70 and 75 are suitably supported by and insulated from the rigid part of the gear shift lever 17 which terminates at its upper end in a hollow knob-forming portion 79 which partially houses the switch 60 and partially forms the usual knob on the upper end of the gear shift lever. The remainder of the knob or housing is formed by a separate portion 80 which is pivotally attached at 81 to the gear shift lever 17 somewhat below the upper end of the latter. A spring 82 is interposed between the pivotally mounted portion 80 of the knob and the rigid portion of the gear shift lever 17 so as to normally urge the portion 80 in a clockwise direction as viewed in Figure 1 of the drawings. The roller 77 is rotatably mounted on an arm 83 which is in turn pivotally connected at 84 to the pivotal section 80 of the knob-forming portion above referred to. A leaf spring 85 fixed to the pivotal portion of the knob at one end, and bearing against the arm 83 at its other end, serves to yieldingly urge the roller 77 against the pivotal contact member 75. With the parts in the position shown in the drawings, that is, with the gear shift knob section 80 subjected to the pressure of the spring 82 to urge it in the normal clockwise direction, the roller 77 lies towards the righthand side of the pivot 76 on which the pivotal contact member 75 is mounted, thereby causing the contact member 75 to assume a normally open position, spaced from the fixed contact member 70. When the knob portion 80 is gripped by the operator and forced in a counter-clockwise direction against the pressure of the spring 82, the roller 77 will move to the left of the pivot 76 which will cause the pivotal contact member 75 to engage the fixed contact 70 and close the switch 60.

The pivotal contact member 75 is connected by a conductor 86 to one side of the field windings of the eddy current device, the opposite side of the field windings being in turn connected by a conductor 87 to the opposite side or pole of the storage battery 58 from that to which the variable resistance is connected.

In the normal operation of the transmission system, the driving member 1 transmits power through the friction clutch 4, which is normally engaged with the flywheel 3, the power in turn being transmitted through the change speed gear unit 9 at whatever speed or gear ratio the change speed transmission unit 9 is set for by suitably shifting the gears of the transmission unit in the conventional manner. During this normal transmission of power through the change speed gear unit 9, both switches 60 and 61 are open, and no current is flowing through the field windings of the eddy current device unit. All power transmitted through the change speed gear unit 9 passes through the transmission shaft 16 and continues through the splined coupling 24 to the hub or sleeve 25 of the flange or disc 26 of the planetary gear mechanism, said disc 26 continuing the power flow from the change speed gear transmission at whatever gear ratio the latter is set for, to the driven member 36 at the output end of the transmission assembly. This transmission of power is therefore independent of any action of the eddy current device.

A reduced gear ratio drive is attained through the planetary gear mechanism and occurs when the eddy current device is energized. In practice, I have found it preferable to employ a gear reduction through the planetary gear mechanism approximately equal to the second gear ratio of the change speed gear unit 9, but it is to be understood that other gear reductions may be used by suitable selection of gears for the planetary gear mechanism, according to the particular requirements or demands encountered in any given application of my new transmission system.

Whenever it is desired to change gears of the change speed gear unit 9, the operator will grasp and grip or squeeze the knob portion of the gear shift lever 17 and at or about the same time disengage the friction clutch 4, thereby closing both switches 60 and 61 so as to energize or excite the eddy current device. Under such conditions of excitation of the eddy current device, the armature 44, together with the gear 42 which are normally rotating under the influence of the driving member 1 which is connected to the gear 42 and armature by the auxiliary or secondary shaft 21 and planetary gear mechanism, will be retarded and stalled, thereby producing a flow of power through the planetary gear mechanism, at a reduced gear ratio, to the driven member 36 which is an integral part of the spider 28, 28'. On completion of the gear shifting operation by the conventional manipulation of the gear shift lever 17, the operator reengages the friction clutch 4, which opens the switch 61, and at or about the same time, releases his grasp from the knob of the gear shift lever, which opens the switch 60, thus breaking the circuit to the eddy current device field. Power will then continue to flow from the driving member 1 to the driven member 36 through the change speed gear unit 9, in the conventional manner, and at the particular gear ratio which was selected in changing gears by means of the shift lever 17. At no time is it necessary to interrupt the power flow from the driving member to the driven member, such power flow being always continuous through either the conventional change speed gear drive or through the electro-magnetic power transmission unit, and no change in the throttle setting of the engine or other prime mover is necessary.

When the gear reduction attained by the planetary gear mechanism is chosen at or about the same value of the second gear ratio of the change speed gear unit 9, it becomes unnecessary to change the change speed gear unit into second gear when shifting beyond third speed. In such a case, the operator can shift directly from third gear into first gear, allowing a little extra time to elapse between engagement of the friction clutch 4 at the time of shifting into third and at the time of shifting into first, during which time interval the electro-magnetic power transmission unit will continue the power flow at a gear reduction comparable to that of the second gear of the change speed gear unit.

In many instances, such as where heavy duty trucks are empty or are not overloaded, the trucks may be started from a standstill by first shifting the change speed gear unit 9 into first gear, then hesitating a little to allow a pick-up of speed during the time the power is transmitted through the electro-magnetic power transmission unit at a gear reduction comparable to second gear, and then shifting into third gear of the change speed gear unit, without going directly into second gear of that unit.

The planetary gear mechanism interposed between the eddy current device and the driven member 36 would also work to considerable advantage in street buses by employing a gear reduction through the planetary gear mechanism which is approximately half way between the level street gear ratio requirement and the level street short block high speed requirement. This would give the bus operator an operating cycle of shifting into a starting ratio by means of his regular change speed gear drive, and then hesitating when he leaves this gear ratio before letting in his clutch on shifting into high speed ratio, such hesitation allowing the electro-magnetic unit to accelerate his speed between the two ratios. The operator therefore is required to make only one shift between stops, with no interruption of power, as compared with the three shifts usually required, along with an interruption of power between each shift. The cycle of operation would be the same as heretofore described for heavy duty low speed truck service.

It will be understood from the foregoing that my new transmission assembly makes a very compact and accessible unit, even though it has two independent power flows through the unit. A standard five speed change speed gear unit, with or without a synchro-mesh feature, may be employed in the assembly, and combined with an electro-magnetic power transmission unit which can be mounted at the output end of the change speed gear unit by means of a convenient adapter plate designated 33. While the eddy current device has been illustrated and described as employing a stationary field and a rotatable armature, the invention is not confined to this arrangement, since the armature may be transposed with relation to the stationary field by arranging the armature within the field and holding it stationary, while the field is mounted for rotation about the armature in a manner comparable to that disclosed in my co-pending application Serial No. 692,473, filed on August 23, 1946, in which I have disclosed a transmission basically similar in principle to that of the present invention, but which was more particularly designed for light loads, such as light weight vehicles and pleasure cars.

As previously indicated, when the operator is not shifting gears, the eddy current device circuit is open, and the armature 44 is rotating at a gear reduction except when the change speed gear unit is operating in high gear, that is, at the speed of the driven member 1. Therefore, whenever the circuit to the eddy current device is closed, armature 44 endeavors to stop rotating, creating a braking effect upon the driven member. Accordingly, it is possible to employ the eddy current device of my new transmission as a brake, which would be of considerable advantage in buses and similar vehicular transmissions where the vehicle is constantly braking at frequent intervals.

In order to effectively utilize the eddy current device as a brake independently of its function during periods of changing gears, the eddy current device circuit is preferably provided with a switch of any suitable type, as diagrammatically indicated at 90, one side of said switch being connected to the conductor 65, and the other side of said switch being connected to the conductor 86 so as to by-pass the two switches 60 and 61, the latter being in series relation to each other. By closing the switch 90, the current from the battery 58 may be caused to flow directly to the field windings of the eddy current device, and pursuant to energization of the eddy current device, rotation of the armature 44, and consequently the driven member 36, will be retarded or braked by the effect of the eddy currents in the manner previously described. This braking action may be employed to supplement the regular brakes provided on the vehicle, or used independently of the latter as the occasion requires. In either event, the magnetic braking action will save considerable wear and tear on the regular brakes.

To restore the circuit to a condition suitable for operation of the eddy current device during periods of changing gears, the switch 90 must be opened and left open in order that the circuit may be controlled by the two switches 60 and 61.

While the specific details have been herein shown and described, the invention is not confined thereto as changes and alterations may be made without departing from the spirit thereof as defined in the appended claims.

I claim:

1. A power transmission for transmitting power from a driving member to a driven member, comprising, in combination, a driving member, a driven member, a change speed gear mechanism including a plurality of selectively operable reduction gears operatively connected to the driven member, manual means to operate said change speed mechanism, a friction clutch for connecting the speed change gear mechanism to the driving member and for disconnecting the same therefrom, at will, during periods of speed changing, an electric-magnetic power transmission unit including an eddy current device having a field and an armature normally rotatable relative to each other responsive to the driving member during transmission of power to the driven member through the change speed gear mechanism, and means for transmitting power from the driving member to the driven member independently of the change speed gear mechanism during periods of speed changing of the latter, said last-named means including a planetary gear system operatively connected to the driving member, the driven member, and to the eddy current device, and means for energizing the eddy current device responsive to operation of the manual means and disengagement of the said friction clutch to cause the relative rotation of the field and armature to be reduced and consequent actuation of the planetary gear system to transmit power directly from the driving member to the driven member through the planetary gear system.

2. In a power transmission system for transmitting power from a rotary driving member to a rotatable driven member, a rotary driving member, a rotatable driven member, a rotatable transmission shaft, selective change speed gears for actuating said shaft, a friction clutch at one end of said transmission shaft for operatively connecting said shaft to the driving member and for disconnecting the same therefrom, at will, during periods of selective speed changing, a rotatable member including a radially extended part connected to the opposte end of said transmission shaft and extended coaxially therefrom and also adapted to be connected to the driven member, gears rotatably mounted on said radially extended part aforesaid, one of said gears having meshing relation with a gear rotatably mounted on the rotatable member aforesaid, an eddy current device including an armature rigidly connected with said last-mentioned gear for rotation therewith, a stationary field disposed within said armature, a shaft extending interiorly through the transmission shaft in coaxial rotatable relation thereto, with one end of said interiorly extended shaft adapted to be connected to the driving member and the other end of said latter shaft having fixed thereto a gear disposed in meshing relation to the gears on the radially extended part aforementioned, and means to energize said device to brake the rotatable member aforesaid against rotation.

3. In a power transmission system for transmitting power from a rotatable prime mover to a load to be driven at variable speeds thereby, the combination of a driving member adapted to be rotated by said prime mover, a driven member adapted to drive said load, change speed gear means interposed between the driving member and the driven member and operatively connected to the latter to transmit power from the driving member thereto at variable speeds when the change speed gear means is connected to the driving member, clutch means interposed between the driving member and the change speed gear means for connecting the latter to the driving member and disconnecting the same therefrom, at will, an electromagnetic power transmission unit including an eddy current device interposed between the change speed gear means and the driven member and operatively connected to the latter and to the driving member, and control means for energizing the eddy current device so as to establish a transmission of power from the driving member to the driven member independently of the change speed gear means, said control means including manual means operable incident to changing speeds by the change speed gear means and responsive to disengagement of the first clutch means.

4. In a power transmission system for transmitting power from a rotatable prime mover to a load to be driven at variable speeds thereby, the combination of a driving member adapted to be rotated by said prime mover, a driven member adapted to drive said load, change speed gear means interposed between the driving member and the driven member and operatively connected to the latter to transmit power from the driving member thereto at variable speeds when the change speed gear means is connected to the driving member, clutch means interposed between the driving member and the change speed gear means for connecting the latter to the driving member and disconnecting the same therefrom, at will, an electro-magnetic power transmission unit including an eddy current device interposed between the change speed gear means and the driven member and operatively connected to the latter and to the driving member, and control means for energizing the eddy current device so as to establish a transmission of power from the driving member to the driven member independently of the change speed gear means, said control means comprising an electrical circuit including a source of electrical energy connected to the eddy current device, and circuit making and breaking means operable incident to changing speeds by the change speed gear means.

5. In a power transmission system for transmitting power from a rotatable prime mover to a load to be driven at variable speeds thereby, the combination of a driving member adapted to be rotated by said prime mover, a driven member adapted to drive said load, change speed gear means interposed between the driving member and the driven member and operatively connected to the latter to transmit power from the driving member thereto at variable speeds when the change speed gear means is connected to the driving member including a manual member to shift the gears of the change speed means, clutch means interposed between the driving member and the change speed gear means for connecting the latter to the driving member and disconnecting the same therefrom, at will, an electromagnetic power transmission unit including an eddy current device interposed between the change speed gear means and the driven member and operatively connected to the latter and to the driven member, and control means for energizing the eddy current device so as to establish a transmission of power from the driving member to the driven member independently of the gears of the change speed gear means, said control means comprising an electrical circuit including a source of electrical energy connected to the eddy current device, and a pair of circuit making and breaking means in said circuit, one operative by the manual member and the other by the first mentioned clutch means to conjointly act to close said circuit preparatory to changing speeds by the change speed gear means.

6. In a power transmission system for transmitting power from a rotatable prime mover to a load to be driven at variable speeds thereby, the combination of a driving member adapted to be rotated by said prime mover, a driven member adapted to drive said load, a pair of power transmitting mechanisms interposed between the driving member and the driven member, one of said mechanisms comprising a change speed gear transmission, and the other of said mechanisms comprising an electro-magnetic power-transmission unit, each of said mechanisms serving to transmit power independently of the other, means to selectively operate said mechanisms so that when one is transmitting power, the other is ineffective, and vice versa, and separate means to operate said electro-magnetic unit to cause same to act as a brake respecting one of said mechanisms.

7. In a power transmission system for transmitting power from a rotatable prime mover to a load to be driven at variable speeds thereby, the combination of a driving member adapted to be rotated by said prime mover, a driven member adapted to drive said load, a pair of power transmitting mechanisms interposed between the driving member and the driven member, one of said mechanisms comprising a change speed gear transmission, and the other of said mechanisms comprising an electro-magnetic power-transmission unit, each of said mechanisms serving to transmit power independently of the other, control means to selectively operate said mechanisms so that when one is transmitting power, the other is ineffective, and for selectively rendering said electro-magnetic unit effective to transmit power from the driving member to the driven member during periods of changing speeds by the change speed gear transmission, and additional control means for applying a braking force to the driven member through effect of the electro-magnetic unit independently of the first-mentioned control means.

8. In a power transmission system for transmitting power from a rotatable prime mover to a load to be driven at variable speeds thereby, the combination of a driving member adapted to be rotated by said prime mover, a driven member adapted to drive said load, a pair of power transmitting mechanisms interposed between the driving member and the driven member, one of said mechanisms comprising a change speed gear transmission, and the other of said mechanisms comprising an electro-magnetic power transmission unit, each of said mechanisms serving to transmit power independently of the other, means to selectively operate said mechanisms so that when one is transmitting power, the other is ineffective, and vice versa, and separate means to operate said electro-magnetic unit to impart a braking effect to its transmission while the change speed gear transmission is operative to carry power from the driving member to the driven member.

RAYMOND A. BECKWITH.

REFERENCES CITED

The following references are of record in the file of this patent:

UNITED STATES PATENTS

| Number | Name | Date |
|---|---|---|
| 516,933 | Jacoby | Mar. 10, 1894 |
| 983,949 | Sundh | Feb. 14, 1911 |
| 1,118,616 | Apple | Nov. 24, 1914 |
| 2,180,474 | Leece | Nov. 21, 1939 |
| 2,200,890 | Murray | May 14, 1940 |
| 2,258,005 | Durdin | Oct. 7, 1941 |
| 2,319,226 | Griswold | May 18, 1943 |
| 2,343,291 | Gilfillan | Mar. 7, 1944 |
| 2,349,410 | Normanville | May 23, 1944 |

FOREIGN PATENTS

| Number | Country | Date |
|---|---|---|
| 291,122 | Great Britain | May 31, 1928 |
| 426,368 | Great Britain | Apr. 2, 1935 |
| 4,330 | France | July 7, 1905 |
|  | (Addition to No. 327,957) |  |
| 28,779 | Austria | June 25, 1907 |
| 509,389 | Germany | Oct. 10, 1930 |